United States Patent
Daniels et al.

(10) Patent No.: US 10,414,692 B2
(45) Date of Patent: *Sep. 17, 2019

(54) EXTRUDED LIGHTWEIGHT THERMAL INSULATING CEMENT-BASED MATERIALS

(71) Applicant: THE INTELLECTUAL GORILLA GMBH, Entlebuch (CH)

(72) Inventors: Evan R. Daniels, Dallas, TX (US); Per Just Andersen, Dorfen (DE)

(73) Assignee: The Intellectual Gorilla GmbH, Sempach Station (CH)

( * ) Notice: Subject to any disclaimer, the term of this patent is extended or adjusted under 35 U.S.C. 154(b) by 636 days.

This patent is subject to a terminal disclaimer.

(21) Appl. No.: 14/785,968

(22) PCT Filed: Apr. 24, 2014

(86) PCT No.: PCT/US2014/035277
§ 371 (c)(1),
(2) Date: Oct. 21, 2015

(87) PCT Pub. No.: WO2014/176414
PCT Pub. Date: Oct. 30, 2014

(65) Prior Publication Data
US 2016/0068435 A1  Mar. 10, 2016
US 2016/0257613 A2  Sep. 8, 2016

Related U.S. Application Data

(60) Provisional application No. 61/815,308, filed on Apr. 24, 2013, provisional application No. 61/815,328, filed on Apr. 24, 2013, provisional application No. 61/815,332, filed on Apr. 24, 2013, provisional application No. 61/820,850, filed on May 8, 2013.

(51) Int. Cl.
| | |
|---|---|
| C04B 14/06 | (2006.01) |
| C04B 14/12 | (2006.01) |
| C04B 18/02 | (2006.01) |
| C04B 28/02 | (2006.01) |
| C04B 14/16 | (2006.01) |
| C04B 41/45 | (2006.01) |
| C04B 111/00 | (2006.01) |
| C04B 111/28 | (2006.01) |
| C04B 111/40 | (2006.01) |

(52) U.S. Cl.
CPC ............ *C04B 18/027* (2013.01); *C04B 14/16* (2013.01); *C04B 28/02* (2013.01); *C04B 41/4543* (2013.01); *C04B 2111/00129* (2013.01); *C04B 2111/28* (2013.01); *C04B 2111/40* (2013.01); *C04B 2201/32* (2013.01); *Y02W 30/92* (2015.05); *Y02W 30/94* (2015.05); *Y02W 30/97* (2015.05)

(58) Field of Classification Search
CPC ....... C04B 18/027; C04B 28/02; C04B 14/16; C04B 41/4543; C04B 2111/40; C04B 2111/00129; C04B 2201/32
See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |
| 3,517,468 A | 6/1970 | Woods |
| 3,852,083 A | 12/1974 | Yang |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |
| 4,171,985 A | 10/1979 | Motoki |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,308,065 A | 12/1981 | Walls-Muycelo |
| 4,339,487 A | 7/1982 | Mullet |

(Continued)

FOREIGN PATENT DOCUMENTS

| | | |
|---|---|---|
| CA | 2799983 A1 | 12/2012 |
| CN | 101113077 A | 1/2008 |

(Continued)

OTHER PUBLICATIONS

European Extended Search Report for EP 14854429.9 dated Jun. 1, 2017.
China Office Action CN201380034441.7 [English Translation] dated Sep. 6, 2015.
Supplementary European Search Report for EP 15803724 dated Jan. 23, 2018.
XP 000375896 6001 Chemical Abstracts 117 Aug. 24, 1992, No. 8, Columbus, Ohio, US.
EP 14759514.4 Extended European Search Report dated Sep. 23, 2016.
Extended Search Report EP 13845068 dated Oct. 16, 2016.

(Continued)

*Primary Examiner* — Anthony J Green
(74) *Attorney, Agent, or Firm* — Daniel J. Chalker; Edwin S. Flores; Chalker Flores, LLP

(57) ABSTRACT

An extrudable cement-based material is formed from a mixture that includes cement in the range of about 40 to 90% by wet weight percent, a lightweight expanded aggregate in the range of about 10 to 60% by wet weight percent, a secondary material in the range of about 0.1 to 50% by wet weight percent, a reinforcement fiber in the range of about 1 to 20% by wet weight percent, a rheology modifying agent in the range of about 0.5 to 10% by wet weight percent, a retarder in the range of about 0.1 to 8% by wet weight percent, and water in the range of 10 to 60% of a total wet material weight.

37 Claims, No Drawings

(56) References Cited

U.S. PATENT DOCUMENTS

| | | |
|---|---|---|
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,066,080 A | 11/1991 | Woodward |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,250,578 A | 10/1993 | Cornwell |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,395,571 A | 3/1995 | Symons |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A | 1/1996 | Morris et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Andersen et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,746,822 A | 5/1998 | Espinoza et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gill et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,268,022 B1 | 7/2001 | Schlegel et al. |
| 6,299,970 B1 | 10/2001 | Richards et al. |
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Schaffer |
| 6,434,899 B1 | 8/2002 | Fortin et al. |

(56) References Cited

U.S. PATENT DOCUMENTS

| | | |
|---|---|---|
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,773,500 B1 | 8/2004 | Creamer et al. |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 9,890,083 B2 * | 2/2018 | Daniels .................. C04B 28/14 |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0025465 A1 | 2/2004 | Aldea |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0053852 A1 | 3/2007 | Beutler et al. |
| 2007/0077436 A1 | 4/2007 | Naji et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1 | 7/2008 | Bury |
| 2008/0286519 A1 | 11/2008 | Nicolson et al. |
| 2009/0011207 A1 | 1/2009 | Dubey |
| 2009/0151602 A1 | 6/2009 | Francis |
| 2009/0197991 A1 | 8/2009 | Bury |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2010/0251632 A1 | 10/2010 | Chen et al. |
| 2010/0252946 A1 | 10/2010 | Stumm |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0276310 A1 | 1/2012 | Andersen et al. |
| 2012/0164402 A1 | 6/2012 | Murakami |
| 2012/0208003 A1 | 8/2012 | Beard |
| 2013/0008115 A1 | 1/2013 | Bierman |
| 2013/0086858 A1 | 4/2013 | Daniels et al. |
| 2013/0216802 A1 | 8/2013 | Leung et al. |
| 2013/0280518 A1 | 10/2013 | Stahli et al. |
| 2014/0000193 A1 | 1/2014 | Daniels et al. |
| 2014/0000194 A1 | 1/2014 | Daniels et al. |
| 2014/0000195 A1 | 1/2014 | Daniels et al. |
| 2014/0000196 A1 | 1/2014 | Daniels et al. |
| 2015/0086769 A1 | 3/2015 | Daniels et al. |
| 2015/0107172 A1 | 4/2015 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102167619 A | 8/2011 |
| CN | 102220829 A | 10/2011 |
| CN | 102643013 A | 8/2012 |
| CN | 102712531 A | 10/2012 |
| DE | 10200601544 A1 | 10/2007 |
| EP | 1266877 A2 | 12/2002 |
| EP | 2189612 A2 | 5/2010 |
| EP | 2230075 A1 | 9/2010 |
| EP | 2314462 A1 | 4/2011 |
| EP | 2583954 A1 | 4/2013 |
| GB | 1265471 A | 3/1972 |
| GB | 1508866 | 4/1978 |
| JP | H05-052075 A | 3/1993 |
| JP | H05-097487 | 4/1993 |

(56) References Cited

FOREIGN PATENT DOCUMENTS

| | | |
|---|---|---|
| JP | H06-56497 A | 3/1994 |
| JP | H11-147777 | 6/1999 |
| JP | 2004332401 A | 11/2004 |
| JP | 2008036549 A | 2/2008 |
| JP | 2008201613 | 9/2008 |
| RU | 2132829 C1 | 7/1999 |
| RU | 2411218 C1 | 2/2011 |
| WO | 199105744 A1 | 5/1991 |
| WO | 02/31306 A1 | 4/2002 |
| WO | 03/004432 A1 | 1/2003 |
| WO | 2005105700 A1 | 11/2005 |
| WO | 2006138732 | 12/2006 |
| WO | 2007051093 | 5/2007 |
| WO | 2007053852 | 5/2007 |
| WO | 20080144186 | 11/2008 |
| WO | 2009038621 A1 | 3/2009 |
| WO | 2010141032 A1 | 12/2010 |
| WO | 2011066192 | 6/2011 |
| WO | 2012084716 A1 | 6/2012 |
| WO | 2013082524 A1 | 6/2013 |

OTHER PUBLICATIONS

Kralj, D., "Experimental study of recycling lightweight concrete with aggregates containing expanded glass." Process Safety and Environmental Protection, vol. 87, No. 4, Jul. 1, 2809 (Jul. 1, 2009), pp. 267-273.
Search Report PCT/US07/04605, dated Oct. 4, 2007.
Search Report PCT US12/059053 dated Mar. 12, 2013.
International Search Report (KIPO) PCT/US2013/048642 dated Sep. 2, 2013.
International Search Report (KIPO) PCT/US2013/048712 dated Sep. 10, 2013.
International Search Report [KIPO] PCT/US2014/035313 dated Aug. 19, 2014.
International Search Report [KIPO] PCT/US2014/035277 dated Sep. 2, 2014.
Office Action [EP 13809252.3] dated Sep. 3, 2018.
Office Action [EP 14788791.3] dated Jan. 8, 2019.

* cited by examiner

EXTRUDED LIGHTWEIGHT THERMAL INSULATING CEMENT-BASED MATERIALS

CROSS-REFERENCE TO RELATED APPLICATIONS

This application claims priority to, and is the National Stage of International Application No. PCT/US2014/035277 filed on Apr. 24, 2014 and claims priority to U.S. Provisional Patent Application Ser. No. 61/815,308, filed on Apr. 24, 2013, U.S. Provisional Patent Application Ser. No. 61/815,328, filed on Apr. 24, 2013, U.S. Provisional Patent Application Ser. No. 61/815,332, filed on Apr. 24, 2013, and U.S. Provisional Patent Application Ser. No. 61/820,850, filed on May 8, 2013. The contents of both applications are hereby incorporated by reference herein in their entirety.

FIELD OF INVENTION

The present invention relates in general to cement-based materials, and more particularly to extruded lightweight thermal insulating cement-based materials.

BACKGROUND ART

Cement-based materials are generally produced using large amount of water to form a slurry that is too wet to extrude. Moreover, cement-based materials are generally not both lightweight and thermally insulating.

SUMMARY OF THE INVENTION

The present invention provides an extrudable lightweight thermal insulating cement-based material that is formed from a mixture that includes cement in the range of about 40 to 90% by wet weight percent, water in the range of about 10 to 60%, a lightweight expanded aggregate in the range of about 5 to 40% by wet weight percent, a secondary material (e.g., sand, rock, fly ash, slag, silica fume, calcium carbonate, etc.) in the range of about 0.1 to 50% by wet weight percent, a reinforcement fiber in the range of about 1 to 20% by wet weight percent, a rheology modifying agent in the range of about 0.5 to 10% by wet weight percent, and a retarder in the range of about 0.1 to 8% by dry weight percent.

In addition, the present invention provides a method for manufacturing an extrudable cement-based material by mixing a cement, a lightweight expanded aggregate, a secondary material, a reinforcement fiber, a rheology modifying agent and a retarder with water, extruding the mixture through a die using an extruder, and allowing the extruded mixture to set.

Moreover, the present invention provides a method of making the extrudable lightweight thermal insulating cement-based material (composite) by the following steps: (1) mixing about 40 to 90% Wt. wet cement with about 10 to 60% Wt. wet water; (2) blending the cement-water mixture with about 5 to 40% Wt. wet lightweight expanded aggregate, about 0.1 to 50% Wt. wet secondary material (e.g., sand, rock, fly ash, slag, silica fume, calcium carbonate, etc.), and about 1 to 20% Wt. wet reinforcement fiber; and (3) adding about 0.5 to 10% Wt. wet rheology modifying agent and about 0.1 to 8% Wt. wet retarder to the mixture. The resulting extrudable lightweight thermal insulating cement-based material can then be extruded and cured (e.g., allowed to sit, heating, steam, etc.).

BRIEF DESCRIPTION OF THE DRAWINGS

For a more complete understanding of the features and advantages of the present invention, reference is now made to the detailed description of the invention along with the accompanying figures and in which:

Not applicable.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an," and "the" are not intended to refer to only a singular entity, but include the general class of which a specific example may be used for illustration. The terminology herein is used to describe specific embodiments of the invention, but their usage does not delimit the invention, except as outlined in the claims.

Ordinary Portland cement or aluminate cement in its wet state with water added before setting, can be rheologically modified in to a clay-like material, which allows the use of the conventional clay production method known as extrusion.

To make the cement-water mixture lightweight, it is blended with about 5-40 wt. % of lightweight expanded aggregate of the total wet volume. The preferred lightweight expanded aggregate is either expanded clay, Perlite, expanded glass, expanded pumice, or a combination thereof. The particle size of the lightweight expanded aggregate is either about 0-1 mm, 1-2 mm, 2-4 mm, 4-8 mm or a combination thereof. A process for making the lightweight expanded glass or pumice aggregate will be described after the discussion regarding the lightweight thermal insulating cement-based material.

For extrusion, the cement-based lightweight thermal insulating composite with approx. 10-60 wt. % water of the total wet material and a suitable rheology modifying admixture is made to feel and behave similar to plastic clay. The material feels plastic/deformable to the touch and can be extruded similar to clay with the use of a clay extruder where the material is conveyed forward by an auger through a barrel and is formed continuously through a die into a final shape with form stability.

Depending on the water content and the amount of rheology modifying admixture, the extruded material can have more or less form stability.

To allow enough time of the cement-based material to be extruded before setting (hardening), the setting time can be retarded up to several hours with the use of small additions of suitable set retarders such as Sodate™ (USG Product) or sodium citrate. Sodate™ is a mixture of Plaster of Paris, sodium citrate and crystalline silica. Following extrusion, the material will within a few hours develop the final strength of the finished product.

To develop the final 28 days strength, the product is either allowed to sit around for 28 days in a humid environment, or the strength development can be accelerated within 24-48 hours by heating either by its own internal heat development or by steam curing such as is conventional in the state-of-the-art.

As will be described below, the present invention provides an extrudable cement-based material that is formed from a mixture that includes cement in the range of about 40 to 90% by dry weight percent, a secondary material in the range of about 0.1 to 50% by dry weight percent, a reinforcement fiber in the range of about 1 to 20% by dry weight percent, a rheology modifying agent in the range of about 0.5 to 10% by dry weight percent, a retarder in the range of about 0.1 to 8% by dry weight percent, a water in the range of 10 to 50% of a total wet material weight.

The cement can be used as a binder with water in a composite composition in combination with a multitude of materials such as sand, gypsum, silica fume, fumed silica, fly ash, slag, rock, cellulose fiber, glass fiber, plastic fiber, polyvinyl alcohol (PVA) fiber, etc., or a combination thereof, which when rheologically modified can be extruded as described above.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC), or hydroxypropoylmethylceluose (HPMC), etc.

Suitable starch-based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is methylhydroxypropylcellulose, examples of which are Methocel™ 240 and Methocel™ 240S, both of which are available from DOW Chemicals, USA.

The finished lightweight thermal insulating cement-based composite will have densities in the range of about 0.2-1.0 g/cm$^3$, compressive strengths in the range of about 0.5 MPa-10 MPa and heat conductance in the range of about 0.05-0.3 W/mK.

In one embodiment of the present invention, the compositional ranges of cement-based material can be:

| Component | Wt. % Range of Wet |
|---|---|
| Cement | 40-90 |
| Water | 10-60 |
| Lightweight expanded aggregate | 5-40 |
| Secondary material (e.g., sand, rock, fly ash, slag, silica fume, calcium carbonate, etc.) | 0.1-50 |
| Reinforcement fiber | 1-20 |
| Rheology modifying agent | 0.5-10 |
| Retarder | 0.1-8 |

The cement can be about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The water can be about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50% 51%, 52%, 53%, 54%, 55%, 56%, 57%, 58%, 59% or 60% by weight or other incremental percentage between.

The lightweight expanded aggregate can be about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% by weight or other incremental percentage between.

The secondary material can be about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The reinforcement fiber can be about 1%, 2%, 3%, 4%, 5%, 6%, 7%, 8%, 9%, 10%, 11%, 12%, 13%, 14%, 15%, 16%, 17%, 18%, 19% or 20% by weight or other incremental percentage between.

The rheology modifying agent can be about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0% by weight or other incremental percentage between.

The retarder can be about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9% or 8.0% by weight or other incremental percentage between.

In addition, the present invention provides a method for manufacturing an extrudable lightweight thermal insulating cement-based material by mixing a cement, a lightweight expanded aggregate, a secondary material, a reinforcement fiber, a rheology modifying agent and a retarder with water, extruding the mixture through a die using an extruder, and allowing the extruded mixture to set (e.g., up to 2 to 3 hours, etc).

Additional steps may include: (1) drying the extruded mixture; (2) curing the extruded mixture; (3) molding, cutting, trimming, sanding or routing the extruded mixture into a specified shape; and/or (4) spraying the extruded mixture with a water repellent.

Following setting and drying of the finished product, the surface of the finished product can be made water resistant with the use of silanes or surface coatings.

Making the lightweight expanded aggregate from glass or pumice will now be described. The lightweight expanded glass or pumice aggregate can be made as follows:

1) Grind glass or pumice in a ball mill to produce ground material predominantly less than about 100 microns.
2) Mix the ground material with about 45-50% water to produce a slurry.
3) Add about 6-7% sodium silicate (substitution ratio of 2.5) to the slurry.
4) Add about 1% sodium nitrate ($NaNO_3$) to the slurry. This later acts as a blowing agent.
5) Aggregates are produced in conventional granulator by feeding about 1 part mixed slurry to 2.5 parts of ground pumice. By varying the amount of water in the slurry and the ratio of ground pumice to the slurry, the aggregate size can be tailored to set a maximum final aggregate size.
6) Following, the formed aggregates are dried in a conventional rotary drier.
7) Following, the dried aggregates together with about 30% finely ground kaolin are fed into a rotary kiln where it is heated between about 800-1400 degrees Celsius, during which process the granules expand to its final size of about 0-8 mm diameter and forms the light weight expanded aggregate.
8) Upon exiting the rotary kiln as last steps the aggregates are cooled and then sieved to divide the aggregate into different end use size ranges such as 0-2 mm, 2-4 mm and 4-8 mm.
9) Alternatively finer aggregates can be formed by following the granulator, feeding the finer aggregates directly in to a flash drier that heat the material above about 800 degrees Celsius and creates expanded aggregates in the size of about 0-1 mm.

The finished lightweight expanded glass or pumice aggregate has a diameter of about 0-8 mm, a bulk density of about 0.10-0.50 g/cm³ and an effective density of about 0.10-0.8 g/cm³. The aggregates further have a compressive strength of about 0.5-5 MPa and are very good heat insulators with heat conductance of about 0.04-0.15 W/mK.

In one embodiment of the present invention, the compositional ranges of the expanded lightweight glass or pumice aggregate can be:

| Component | Wt. % Range |
| --- | --- |
| Slurry: | |
| Ground glass or pumice | 40-60 |
| Water | 40-60 |
| Sodium silicate | 3-15 |
| $NaNO_3$ | 0.1-5 |
| For granulator: | |
| Ground glass or pumice | 50-85 |
| Slurry | 15-50 |

For the slurry, the ground glass or pumice can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the water can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the sodium silicate can be about 3%, 4%, 5%, 6%, 7%, 8%, 9%, 10%, 11%, 12%, 13%, 14% or 15% by weight or other incremental percentage between.

For the slurry, the $NaNO_3$ can be about 0.1%, 0.2%, 0.3%, 0.4%, 0.5%, 0.6%, 0.7%, 0.8%, 0.9%, 1%, 2%, 3%, 4% or 5% by weight or other incremental percentage between.

For the granulator, the ground glass or pumice can be about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% or 85% by weight or other incremental percentage between.

For the granulator, the slurry can be about 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

In another embodiment of the present invention the compositional ranges of the expanded lightweight glass or pumice aggregate can be:

| Component | Wt. % Range |
| --- | --- |
| Slurry: | |
| Ground glass or pumice | 40-60 |
| Water | 45-50 |
| Sodium silicate | 6-7 |
| $NaNO_3$ | 0.9-1.1 |
| For granulator: | |
| 1 part slurry to 2.5 parts ground glass or pumice | |

For the slurry, the ground glass or pumice can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the water can be about 45%, 46%, 47%, 48%, 49% or 50% by weight or other incremental percentage between.

For the slurry, the sodium silicate can be about 6.0%, 6.1%, 6.2%, 6.3%, 6.4%, 6.5%, 6.6%, 6.7%, 6.8%, 6.9% or 7.0% by weight or other incremental percentage between.

For the slurry, the $NaNO_3$ can be about 0.9%, 1.0% or 1.1% by weight or other incremental percentage between.

It may be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications, patents and patent applications are herein incorporated by reference to the same extent as if each individual publication, patent or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it may be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. An extrudable lightweight thermal insulating cement-based material formed from a mixture comprising:
   a cement in the range of about 40 to 90% by wet weight percent;
   a lightweight expanded aggregate comprising expanded glass, expanded pumice, or a combination thereof in the range of about 5 to 40% by wet weight percent;
   a secondary material in the range of about 0.1 to 50% by wet weight percent;
   a reinforcement fiber in the range of about 1 to 20% by wet weight percent;
   a rheology modifying agent in the range of about 0.5 to 10% by wet weight percent;
   a retarder in the range of about 0.1 to 8% by wet weight percent;
   a water in the range of 10 to 60% of a total wet material weight; and
   the mixture is extrudable.

2. The extrudable lightweight thermal insulating cement-based material as recited in claim 1, the expanded glass or the expanded pumice formed from a mixture comprising:
   a ground glass or pumice in the range of about 40 to 60% by weight percent for a slurry;
   a water in the range of about 40 to 60% by weight percent for the slurry;
   a sodium silicate in the range of about 3 to 15% by weight percent for the slurry;
   a $NaNO_3$ in the range of about 0.1 to 5% for the slurry;
   the ground glass or pumice in the range of about 50 to 80% by weight percent for a granulator;
   the slurry in the range of about 15 to 50% by weight percent for the granulator; and
   wherein the mixture is processed using the slurry and the granulator such that the expanded lightweight aggregate has a maximum final aggregate size.

3. The extrudable lightweight thermal insulating cement-based material as recited in claim 2, the granulator having a ratio of about 1 part slurry to about 2.5 parts ground glass or pumice.

4. The extrudable lightweight thermal insulating cement-based material as recited in claim 1, the expanded glass or the expanded pumice formed from a mixture consisting essentially of:
   a ground glass or pumice in the range of about 40 to 60% by weight percent for a slurry;
   a water in the range of about 40 to 60% by weight percent for the slurry;
   a sodium silicate in the range of about 3 to 15% by weight percent for the slurry;
   a $NaNO_3$ in the range of about 0.1 to 5% for the slurry;
   the ground glass or pumice in the range of about 50 to 80% by weight percent for a granulator;
   the slurry in the range of about 15 to 50% by weight percent for the granulator; and
   wherein the mixture is processed using the slurry and the granulator such that the expanded lightweight aggregate has a maximum final aggregate size.

5. The extrudable lightweight thermal insulating cement-based material as recited in claim 1, the expanded glass or the expanded pumice formed from a mixture comprising:
   a ground glass or pumice in the range of about 40 to 60% by weight percent for a slurry;
   a water in the range of about 45 to 50% by weight percent for the slurry;
   a sodium silicate in the range of about 6 to 7% by weight percent for the slurry;
   a $NaNO_3$ in the range of about 0.9 to 1.1% for the slurry; and
   wherein a granulator forms the expanded glass or the expanded pumice using a ratio of 1 part slurry to about 2.5 parts ground glass or pumice.

6. The extrudable lightweight thermal insulating cement-based material as recited in claim 1, the expanded glass or the expanded pumice having a diameter of about 0-8 mm, a bulk density in the range of about 0.10 to 0.5 $g/cm^3$, a effective density in the range of about 0.10 to 0.8 $g/cm^3$, a compressive strength in the range of about 0.5 MPa to 5 MPa, and a heat conductance in the range of about 0.04 to 0.15 W/mK.

7. The extrudable lightweight thermal insulating cement-based material as recited in claim 1, the lightweight expanded aggregate having a particle size comprising about 0-1 mm, 1-2 mm, 2-4 mm, 4-8 mm or a combination thereof.

8. The extrudable lightweight thermal insulating cement-based material as recited in claim 1, the secondary material comprising sand, gypsum, silica fume, fumed silica, fly ash, slag, rock, or a combination thereof.

9. The extrudable lightweight thermal insulating cement-based material as recited in claim 1, the reinforcement fiber comprising cellulose fiber, glass fiber, plastic fiber, polypropylene fiber, polyvinyl alcohol (PVA) fiber, homopolymer acrylic fiber, or a combination thereof.

10. The extrudable lightweight thermal insulating cement-based material as recited in claim 1, the rheology modifying agent comprising a polysaccharide, a polysaccharide derivative, a protein, a protein derivative, a synthetic organic material, a synthetic organic material derivative, or a combination thereof.

11. The extrudable lightweight thermal insulating cement-based material as recited in claim 10, the polysaccharide comprising a cellulose-based material, a cellulose-based material derivative, a starch-based material, a starch-based material derivative, or a combination thereof.

12. The extrudable lightweight thermal insulating cement-based material as recited in claim 11, the cellulose-based material is selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropoylmethylcelluose (HPMC).

13. The extrudable lightweight thermal insulating cement-based material as recited in claim 11, the starch-based material is selected from the group consisting of wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches.

14. The extrudable lightweight thermal insulating cement-based material as recited in claim 1, the retarder comprising sodium citrate, or a mixture of Plaster of Paris, sodium citrate and crystalline silica.

15. The extrudable lightweight thermal insulating cement-based material as recited in claim 1, the extrudable lightweight thermal insulating cement-based material having a density in the range of about 0.2 to 1.0 g/cm³, a compressive strength in the range of about 0.5 MPa to 10 MPa, and a heat conductance in the range of about 0.05 to 0.3 W/mK.

16. An extrudable lightweight thermal insulating cement-based material formed from a mixture consisting essentially of:
a cement in the range of about 40 to 90% by wet weight percent;
a lightweight expanded aggregate comprising expanded glass, expanded pumice, or a combination thereof in the range of about 5 to 40% by wet weight percent;
a secondary material in the range of about 0.1 to 50% by wet weight percent;
a reinforcement fiber in the range of about 1 to 20% by wet weight percent;
a rheology modifying agent in the range of about 0.5 to 10% by wet weight percent;
a retarder in the range of about 0.1 to 8% by wet weight percent;
a water in the range of 10 to 60% of a total wet material weight; and
the mixture is extrudable.

17. A method for manufacturing an extrudable lightweight thermal insulating cement-based material comprising the steps of:
mixing a cement in the range of about 40 to 90% by wet weight percent, a lightweight expanded aggregate comprising expanded glass, expanded pumice, or a combination thereof in the range of about 5 to 40% by wet weight percent, a secondary material in the range of about 0.1 to 50% by wet weight percent, a reinforcement fiber in the range of about 1 to 20% by wet weight percent, a rheology modifying agent in the range of about 0.5 to 10% by wet weight percent and a retarder in the range of about 0.1 to 8% by wet weight percent with water in the range of 10 to 60% of a total wet material weight;
extruding the mixture through a die using an extruder; and
allowing the extruded mixture to set.

18. The method as recited in claim 17, the expanded glass or the expanded pumice formed from a mixture comprising:
a ground glass or pumice in the range of about 40 to 60% by weight percent for a slurry;
a water in the range of about 40 to 60% by weight percent for the slurry;
a sodium silicate in the range of about 3 to 15% by weight percent for the slurry;
a NaNO₃ in the range of about 0.1 to 5% for the slurry;
the ground glass or pumice in the range of about 50 to 80% by weight percent for a granulator;
the slurry in the range of about 15 to 50% by weight percent for the granulator; and
wherein the mixture is processed using the slurry and the granulator such that the expanded lightweight aggregate has a maximum final aggregate size.

19. The method as recited in claim 18, the granulator having a ratio of about 1 part slurry to about 2.5 parts ground glass or pumice.

20. The method as recited in claim 17, the expanded glass or the expanded pumice formed from a mixture consisting essentially of:
a ground glass or pumice in the range of about 40 to 60% by weight percent for a slurry;
a water in the range of about 40 to 60% by weight percent for the slurry;
a sodium silicate in the range of about 3 to 15% by weight percent for the slurry;
a NaNO₃ in the range of about 0.1 to 5% for the slurry;
the ground glass or pumice in the range of about 50 to 80% by weight percent for a granulator;
the slurry in the range of about 15 to 50% by weight percent for the granulator; and
wherein the mixture is processed using the slurry and the granulator such that the expanded lightweight aggregate has a maximum final aggregate size.

21. The method as recited in claim 17, the expanded glass or the expanded pumice formed from a mixture comprising:
a ground glass or pumice in the range of about 40 to 60% by weight percent for a slurry;
a water in the range of about 45 to 50% by weight percent for the slurry;
a sodium silicate in the range of about 6 to 7% by weight percent for the slurry;
a NaNO₃ in the range of about 0.9 to 1.1% for the slurry; and
wherein a granulator forms the expanded glass or the expanded pumice using having a ratio of 1 part slurry to about 2.5 parts ground glass or pumice.

22. The method as recited in claim 17, the expanded glass or the expanded pumice having a diameter of about 0-8 mm, a bulk density in the range of about 0.10 to 0.5 g/cm³, a effective density in the range of about 0.10 to 0.8 g/cm³, a compressive strength in the range of about 0.5 MPa to 5 MPa, and a heat conductance in the range of about 0.04 to 0.15 W/mK.

23. The method as recited in claim 17, further comprising, prior to mixing the cement, the step of making the lightweight expanded aggregate comprising the steps of:
- mixing a ground glass or pumice in the range of about 40 to 60% by weight percent with water in the range of about 40 to 60% by weight percent to produce a slurry;
- adding a sodium silicate in the range of about 3 to 15% by weight percent to the slurry;
- adding a $NaNO_3$ in the range of about 0.1 to 5% to the slurry;
- forming aggregates in a granulator by feeding the ground glass or pumice in the range of about 50 to 80% by weight percent with the slurry in the range of about 15 to 50% by weight percent;
- drying the formed aggregates;
- heating the dried aggregates together with about 30% finely ground kaolin to a temperature of about 800 to 1400 degrees Celsius; and
- cooling the heated aggregates.

24. The method as recited in claim 17, the lightweight expanded aggregate having a particle size comprising about 0-1 mm, 1-2 mm, 2-4 mm, 4-8 mm or a combination thereof.

25. The method as recited in claim 17, the secondary material comprising sand, gypsum, silica fume, fumed silica, fly ash, slag, rock, or a combination thereof.

26. The method as recited in claim 17, the reinforcement fiber comprising cellulose fiber, glass fiber, plastic fiber, polypropylene fiber, polyvinyl alcohol (PVA) fiber, homopolymer acrylic fiber, or a combination thereof.

27. The method as recited in claim 17, the rheology modifying agent comprising a polysaccharide, a polysaccharide derivative, a protein, a protein derivative, a synthetic organic material, a synthetic organic material derivative, or a combination thereof.

28. The method as recited in claim 27, the polysaccharide comprising a cellulose-based material, a cellulose-based material derivative, a starch-based material, a starch-based material derivative, or a combination thereof.

29. The method as recited in claim 28, the cellulose-based material is selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropoylmethylcelluose (HPMC).

30. The method as recited in claim 28, the starch-based material is selected from the group consisting of wheat starch, pre-gelled wheat starch, potato starch, pre-gelled potato starch, amylopectin, amylose, seagel, starch acetates, starch hydroxyethyl ethers, ionic starches, long-chain alkyl-starches, dextrins, amine starches, phosphate starches, or dialdehyde starches.

31. The method as recited in claim 17, the retarder comprising sodium citrate, or a mixture of Plaster of Paris, sodium citrate and crystalline silica.

32. The method as recited in claim 17, the extruded mixture having a density in the range of about 0.2 to 1.0 $g/cm^3$, a compressive strength in the range of about 0.5 MPa to 10 MPa, and a heat conductance in the range of about 0.05 to 0.3 W/mK after being set, cured or dried.

33. The method as recited in claim 17, wherein the extruded mixture is allowed to set for 2 to 3 hours.

34. The method as recited in claim 17, further comprising the step of curing the extruded mixture.

35. The method as recited in claim 17, further comprising the step of drying the extruded mixture.

36. The method as recited in claim 17, further comprising the step of molding, cutting, trimming, sanding or routing the extruded mixture into a specified shape.

37. The method as recited in claim 17, further comprising the step of spraying the extruded mixture with a water repellent.

* * * * *